INVENTOR.
WILLIAM M. HALLIDY

INVENTOR.
WILLIAM M. HALLIDY
BY Hudson Boughton,
Williams, David & Hoffmann
ATTORNEYS Nov. 14, 1961   W. M. HALLIDY   3,009,091
ELECTRIC GENERATING SYSTEMS
Filed June 9, 1958   5 Sheets-Sheet 3

INVENTOR.
WILLIAM M. HALLIDY
BY
ATTORNEYS

INVENTOR.
WILLIAM M. HALLIDY
BY Hudson, Daughton,
Williams, David & Hoffman
ATTORNEYS

Nov. 14, 1961 W. M. HALLIDY 3,009,091
ELECTRIC GENERATING SYSTEMS
Filed June 9, 1958 5 Sheets-Sheet 5

INVENTOR.
WILLIAM M. HALLIDY
BY
ATTORNEYS

United States Patent Office 3,009,091
Patented Nov. 14, 1961

3,009,091
ELECTRIC GENERATING SYSTEMS
William M. Hallidy, Lakewood, Ohio, assignor to The Leece-Neville Company, Cleveland, Ohio, a corporation of Ohio
Filed June 9, 1958, Ser. No. 740,743
27 Claims. (Cl. 322—28)

This invention relates to electric generating systems and generator regulation and, as one of its objects, provides novel regulating means for controlling the voltage and current values of the output of an electric generator.

Another object is to provide novel regulating means for controlling an electric generator and in accordance with which the field excitation of the generator is controlled by a solid-state semiconductor device that exhibits characteristics of what is known in the electrical art as "avalanche breakdown" and whose breakdown point can be controlled, one form of such an avalanche breakdown device which is suitable for the purposes of this invention being a commercially available device called a "controlled rectifier."

As is understood by persons skilled in the electrical art, a controlled rectifier is a solid-state semiconductor junction-type of device, preferably made of silicon or a silicon compound, and which is intermittently, or cyclically, conductive and nonconductive under certain conditions. The device has main electrodes or terminals consisting of a cathode and an anode and also has a starter or control electrode which is at times referred to as a gate electrode or gate.

Such a controlled rectifier is illustrated and further described herein but it can be explained to advantage at this point that the device is a current blocking device in the sense that it acts at all times to block current trying to flow therethrough from the cathode to the anode. It also acts as a blocking device which blocks current trying to flow from the anode to the cathode, namely at all times when there is no current flowing from the gate to the cathode, that is, at all times except when a flow of current from the anode to the cathode has been initiated by the gate-to-cathode current flow.

When there is a flow of current from the gate to the cathode of the controlled rectifier, current will then be permitted to flow through the device from the anode to the cathode, provided that the necessary potential for such a flow exists between the anode and cathode. It is also characteristic of this device that once current starts to flow from the anode to the cathode, the gate loses control of the conductivity of the device. Varying the gate-to-cathode current serves only to vary the potential required between the anode and cathode to cause current to start to flow from the anode to the cathode.

Once the flow of anode to cathode current has started it will continue, provided the necessary potential continues to exist between the anode and cathode, regardless of variation in or interruption of the gate to cathode current. However, when the anode-to-cathode current is interrupted or the necessary potential between the anode and cathode is removed, the device ceases to be conductive and will not again become conductive until a gate-to-cathode current is again provided. It is also characteristic of such a controlled rectifier that, regardless of the potential existing across the anode and cathode at the time of starting of the current flow thereacross, the anode-to-cathode potential drops to a rated value and remains substantially at that value during the period of conductivity.

Although the present invention provides novel electric generating apparatus and regulating means utilizing a solid-state semiconductor device having avalanche breakdown characteristics and, as a practical form of such device makes use of a controlled rectifier, it should be understood that other equivalent devices are intended to be included in this invention.

Still another object of this invention is to control the field excitation of an electric generator by means of a device that can exist in only one of two stable conditions, namely, non-conducting or fully conducting; and when the device is in the fully conducting condition there is only a low voltage drop across the device so that there is very little power dissipated in the device itself.

A further object of this invention is to provide novel regulating means for an electric generator wherein the field excitation of the generator is controlled by an intermittent conductivity through the main electrodes of a controlled rectifier in response to a control current or signal applied to the gate of the controlled rectifier, the gate-applied control signal preferably being supplied by a sensing means in accordance with an existing need for regulation, and the control signal and the conductivity through the main electrodes being automatically and intermittently interrupted for causing the desired control of the field excitation current.

This invention also provides novel regulating means of the character above indicated and which is applicable to generating systems of the kind having an alternating current portion, the phase reversal in the alternating current portion being used to bring about the automatic interruption of the conductivity of the controlled rectifier.

Another object of this invention is to provide a novel voltage regulator for an alternating current generator wherein the regulator comprises a control device of the kind above referred to and which control device also acts as a rectifier to furnish rectified current as excitation current for the main field, thereby replacing the direct current generator usually needed as an exciter for large alternating current generators.

Yet another object is to provide novel regulating means for an electric generating system consisting of an alternator and a power rectifier for supplying current to a direct current load which includes a storage battery, the regulating means operating to cause the field winding to be excited by the alternator windings without need for any relay or the like for disconnecting the field from the storage battery.

Additionally, this invention provides electric generating apparatus and regulating means employing a novel rectifier arrangement that will automatically apply full voltage to the control device of regulating means of the kind above referred to for five-sixths of the generating cycle of a three-phase alternator and will automatically remove the voltage for one-sixth of the cycle.

Other objects and advantages of this invention will be apparent in the following detailed description and in the accompanying drawings forming a part of this specification and in which.

Figure 1:
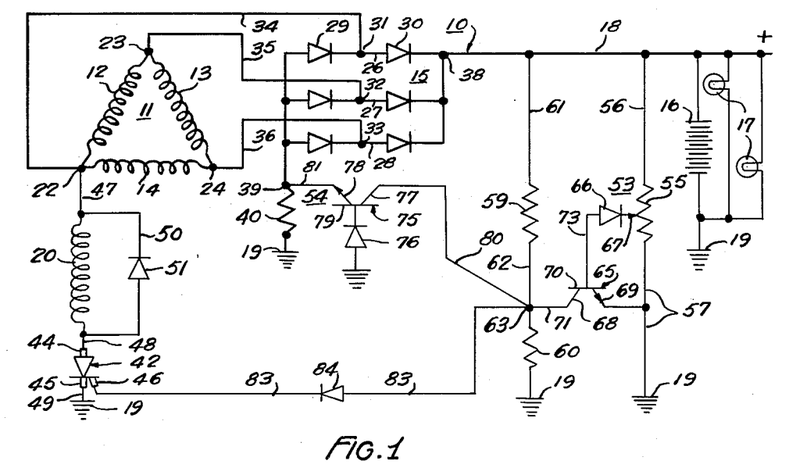
FIG. 1 is a wiring diagram showing an electric generating system embodying the controlled rectifier regulating means of this invention and showing the regulating means being used to achieve both voltage and current regulation.

As representing one practical embodiment of the present invention, FIG. 1 shows an electric generating system 10 in which a controlled rectifier device 42 of the kind mentioned above is employed as a regulating means for the voltage and current values of the power output of the generator of the system.

Before proceeding with a detailed description of the system 10 and the regulating means thereof, it can be explained to advantage that there are several ways to control the field excitation of an electric generator but this function is usually accomplished by means of a variable resistance in the field circuit. Regulators employing such a variable resistance are usually mechanical and thus are susceptible to shock, mechanical wear, and the like. Exceptions to this are regulator circuits employing transistors as variable resistors. The problem with transistor circuits, however, is that, at one-half field excitation, the transistor must dissipate one-fourth of the full excitation wattage rating of the field, and this limits the maximum field wattage permissible in an electric generator and accordingly limits the performance of the generator.

So-called "switching circuits" employing transistors have been devised, but these circuits are only very high gain circuits depending on the ripple in the regulated voltage to switch the circuit from one condition to another. These transistor switching circuits regulate the field excitation by pulse width modulation. The circuits provided by this invention and described hereinafter have pulses of relatively constant width and regulate the field excitation by the number of pulses in a given unit of time.

Figure 9:
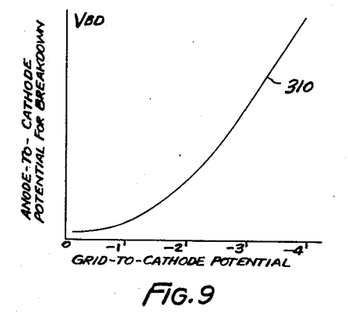
FIG. 9 is a graph illustrating breakdown characteristics of a conventional thyratron electron tube.

Since the present invention utilizes the principle of avalanche breakdown, it should be explained in this connection that one device exhibiting this phenomenon is a conventional thyratron, which is a vapor-or gas-filled tube. The operating characteristics of a thyratron are well known in the art. For comparison and reference purposes FIG. 9 of the drawings shows a voltage curve 310 which is characteristic of a thyratron for variation of grid-to-cathode potential when breakdown occurs.

Figure 10:
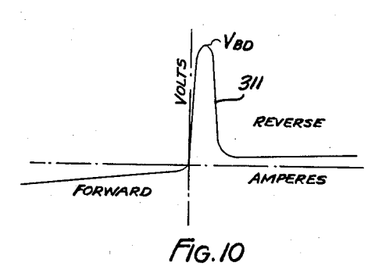
FIG. 10 is a graph illustrating avalanche breakdown characteristics of a known form of diode.

The curve 311 of FIG. 10 is a typical EI curve for a conventional solid-state semiconductor device that also exhibits the characteristic of avalanche breakdown, namely, a Westinghouse Dynistor Diode. This diode has a PN junction and, when a potential is applied across the PN junction in the reverse direction and raised in value, breakdown occurs and the device becomes conductive. Only a small leakage current exists in the device until the breakdown voltage $V_{BD}$ is reached. Once the breakdown voltage is reached, the current increases rapidly and the voltage drop across the PN junction drops to a very small value as represented in FIG. 10. The only way to stop the current flow is to remove the potential across the diode.

There are existing solid-state semiconductor devices exhibiting the characteristic or phenomenon of avalanche breakdown and whose breakdown point is controllable. One of these devices is known as a controlled rectifier, or a silicon controlled rectifier, and is the control device 42 made use of in the disclosure of the present invention. The controlled rectifier 42 is a PNPN junction device, as represented diagrammatically in FIG. 11. A symbolic representation of this device is shown in FIG. 12. The main terminals or electrodes of the controlled rectifier 42 are designated by the reference numerals 44 and 45, of which 44 is the anode and 45 is the cathode, and the control electrode or gate is designated by the reference numeral 46.

Figure 13:
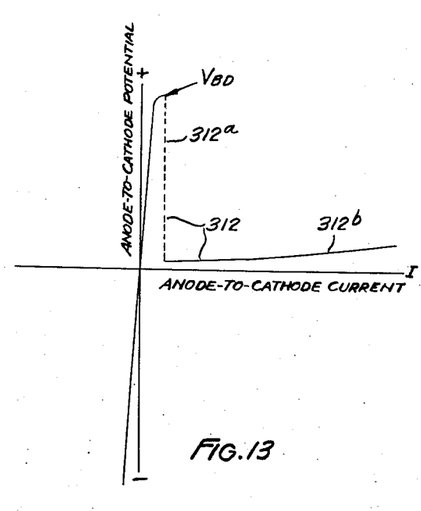
FIG. 13 is a graph illustrating avalanche breakdown characteristics of the controlled rectifier.

FIG. 13 shows a curve 312 which is characteristic for the controlled rectifier 42 and illustrates the sharp drop which takes place in anode-to-cathode voltage when the breakdown voltage $V_{BD}$ is reached and breakdown occurs. The curve portion 312$^a$ illustrates this sharp drop in anode-to-cathode voltage, and the curve portion 312$^b$ illustrates the substantially constant and relatively low anode-to-cathode voltage which prevails after the occurrence of breakdown.

Figure 14:
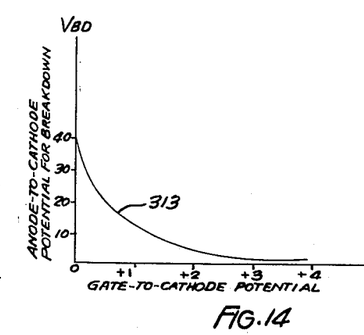
FIGS. 14 and 15 are graphs illustrating gate potential and gate current characteristics in relation to breakdown voltage across the main electrodes of the controlled rectifier.

FIG. 14 shows a characteristic curve 313 which is representative of the value of anode-to-cathode potential needed in the controlled rectifier 42 for producing breakdown, in relation to variations in the value of the gate-to-cathode potential for the control signal.

Figure 15:
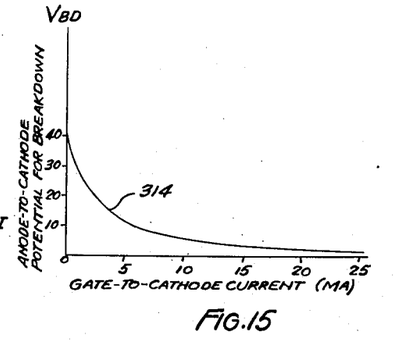

FIG. 15 shows a curve 314 which is characteristic of the controlled rectifier 42 and is representative of the value of anode-to-cathode potential $V_{BD}$ needed for breakdown, in relation to variations in the value of the gate-to-cathode current in milliamperes for the control signal.

The controlled rectifier 42 is in contrast with a thyratron in that the thyratron is voltage controlled while the controlled-rectifier is current controlled. In other words, the amount of current flowing in the gate-to-cathode circuit in the controlled-rectifier determines the anode-to-cathode potential required to initiate breakdown, whereas the grid-to-cathode potential determines the breakdown potential of the thyratron. It is true for the controlled rectifier that a gate-to-cathode potential is required for a gate-to-cathode current, but the controlled rectifier breakdown potential is inversely proportional to gate-to-cathode potential while in the thyratron the breakdown potential is directly proportional to the grid-to-cathode potential.

Reverting now to the generating system 10 of FIG. 1, the drawings show this system as comprising an alternator 11, in this instance a three-phase alternator having phase or inductor windings 12, 13 and 14, and a power rectifier 15 for supplying rectified current from the alternator to an external load. The external load is here represented as comprising a storage battery 16 and lamps 17, which are connected in circuit with power rectifier 15 by a load conductor 18 and a common ground 19. The alternator 11 also comprises a field winding 20 whose energization is varied, as explained hereinafter, by novel regulating means comprising the controlled rectifier 42.

The phase windings 12, 13 and 14 of the alternator 11 are shown in FIG. 1 as being in a delta connected relation, although a Y or star-connected relation could be employed as shown in FIGS. 3 to 8 inclusive. The phase windings 12, 13 and 14 are connected in the delta relation just mentioned through phase winding terminals or output terminals, designated 22, 23 and 24.

The power rectifier 15 can be a silicon rectifier or any other suitable form of power rectifier and is here shown as being a three-phase full-wave rectifier comprising three circuit arms 26, 27 and 28, each containing a pair of rectifier cells 29 and 30. The circuit arms 26, 27 and 28 are provided with input terminals 31, 32 and 33 located between the pairs of rectifier cells and which input terminals are connected with the respective phase terminals 22, 23 and 24 by conductors 34, 35 and 36. The power rectifier 15 has direct current output terminals, or load terminals, 38 and 39 of which the terminal 38 is the positive terminal and has the load conductor 18 connected therewith. The output terminal 39 is connected with the common ground 19 through a resistor 40 to which further reference will be made hereinafter.

The regulating means provided for the generator 11 and the system 10 by the present invention comprises a current-blocking control device having avalanche breakdown characteristics, in this case, a controlled rectifier device 42 which is located in the circuit of the field winding 20 and is connected with the load terminals 38 and 39 of the power rectifier 15 by control circuit means which will be presently described. The controlled rectifier 42 is intermittently conductive in response to changes in the operating condition of the generator 11, namely variations above and below certain desired regulated voltage and current values of the generator output, and varies the energization of the field winding 20 accordingly.

Figure 11:
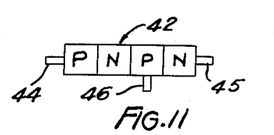
FIG. 11 is a diagrammatic illustration of the controlled rectifier employed in the regulating means of this invention.
Figure 12:
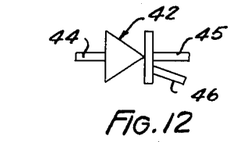
FIG. 12 is a symbolic illustration of the controlled rectifier.

As shown in FIG. 11 and already mentioned above, the controlled rectifier 42 is a PNPN junction device having a pair of main electrodes consisting of the anode 44 and the cathode 45, and also having the control electrode or gate 46. One existing form of such a controlled rectifier is known as General Electric Company's Silicon Controlled Rectifier Type ZJ-39A.

The field circuit of the alternator 11 comprises a conductor 47 connecting one end of the field winding 20 with one of the phase terminals, in this instance the phase terminal 22, and a conductor 48 connecting the other end of the field winding with the anode 44 of the controlled rectifier 42. The field circuit also comprises a conductor 49 connecting the cathode 45 with the common ground 19. The field circuit is here shown as also comprising a circuit portion 50 extending in shunt relation to the field winding 20 and having a suitable diode 51 therein for protecting the controlled rectifier 42 by dissipating the induced potential or so-called "inductive kick" of the field winding.

The control circuit means for the controlled rectifier 42 is connected with the gate 46 and supplies control current or signals to the latter in accordance with variations occurring in the power output of the generating system 10 above and below a given or predetermined regulated value. This control circuit means includes a voltage sensing means 53 and a current sensing means 54 and will be described next.

The voltage sensing means 53 includes a voltage divider or potentiometer type of resistor 55, which is connected across the load conductor 18 and the common ground 19 by conductors 56 and 57, and a pair of resistors 59 and 60 which are also connected between the load conductor 18 and the common ground 19. One end of the resistor 59 is connected with the load conductor 18 by a conductor 61, and the adjacent ends of the resistors 59 and 60 are connected by a conductor 62 which includes a voltage reference junction point or terminal 63.

The voltage sensing means 53 also includes a transistor 65 and a suitable diode 66, such as a Zener diode, through which the reference point 63 is connected with the shiftable contact 67 of the variable resistor device 55. The transistor 65 is here shown as being an NPN transistor of a conventional form having collector and emitter electrodes 68 and 69 and a control electrode or base 70. The collector 68 is connected with the reference point 63 by a conductor 71. The emitter 69 is connected with the conductor 57, and through the latter, with the common ground 19. The base 70 is connected with the shiftable contact 67 of the resistance device 55 through a conductor 73 and through the diode 66.

The current sensing means 54 comprises, in addition to the resistor 40, a second transistor 75 and a suitable diode 76. The transistor 75 has collector and emitter electrodes 77 and 78 and a control electrode or base 79. The collector 77 is connected with the reference point 63 by a conductor 80. The emitter 78 is connected with the load terminal 39 of the power rectifier 15 by a conductor 81. The base 79 is connected with the common ground 19 through the diode 76.

The reference point 63 is connected with the gate 46 of the controlled rectifier 42 by a conductor 83 and through a suitable blocking diode 84 located in the latter. The voltage and current sensing means 53 and 54 will thus be effective to vary the potential of the reference point 63 in accordance with regulation needed by the alternator 11 and to supply corresponding current variations or signals to the gate 46 of the controlled rectifier 42.

To explain the operation of the novel generating system 10 and the regulating means thereof, it will be assumed first that the output voltage at the direct current terminals 38 and 39 of the power rectifier 15 is below the desired or regulated voltage. Current will accordingly flow through the resistors 59 and 60 to the ground 19 making the reference point 63 positive with respect to the ground. When the potential of the reference point 63 is of a suitable value, the diode 84 becomes conductive so that the positive potential of the reference point is applied to the gate 46 of the controlled rectifier 42. The signal thus supplied to the gate 46 causes gate-to-cathode current to flow in the controlled rectifier between the electrodes 46 and 45 thereby causing the controlled rectifier to become conductive through the main electrodes 44 and 45 thereof.

The potential of the reference point 63 which will be effective to thus cause the controlled rectifier 42 to become conductive is so selected that the value thereof which will cause gate-to-cathode current to flow, will always be in excess of that required for this purpose, for all values of potential difference which will occur across the main electrodes 44 and 45. In other words, the potential of the reference point 63 is selected so that whenever gate-to-cathode current flows in the controlled rectifier, anode-to-cathode current will always flow even if the potential difference between the anode 44 and cathode 45 is at its minimum value.

When the phase terminal 22 is negative with respect to the common ground 19, no anode-to-cathode current will flow through the controlled rectifier 42 because of the blocking action of this device. However, when the phase terminal 22 is positive with respect to ground, anode-to-cathode current will flow through the controlled rectifier 42 to cause excitation of the field winding 20, provided that the controlled rectifier has been rendered conductive by the application of a suitable signal to the gate 46 in the manner explained above.

When the controlled rectifier becomes conductive in the manner and under the circumstances just explained above, the field winding 20 will be energized to cause the output of the alternator 11 to increase to bring the output up to the regulated value.

When the controlled rectifier 42 has been thus rendered conductive for energizing the field winding 20, it will continue to be conductive regardless of decrease or interruption in the signal potential being applied to the gate 46, until the potential being applied across the main electrodes of the controlled rectifier decreases to a zero value which will be when the polarity is reversd by reason of the inherent functioning of the alternator 11. Thus, energizing current in the field winding 20 will flow for one-third of the overall phase cycle of the alternator 11 after the controlled rectifier 42 has become conductive, whereupon the potential across the main electrodes 44 and 45 will drop to zero value to nullify or interrupt the conductivity of the controlled rectifier for two-thirds of the phase cycle of the alternator. The gate 46 thereupon loses control and the controlled rectifier 42 will not again become conductive until the phase terminal 22 once more becomes negative with respect to the ground 19 and a suitable control signal is called for by the sensing means and is applied to the gate.

When the output of the generator 11 exceeds the regulated voltage, the diode 66 becomes conductive to allow current to flow from the base 70 to the emitter 69 of the transistor 65 whereupon current will flow from the collector 68 to the emitter 69 of this transistor and thence to the ground 19. The reference point 63 is thus connected to ground through the transistor 65 to thereby reduce the potential of the reference point to a value where the gate-to-cathode current will no longer flow in the controlled rectifier 42, and the latter device will become nonconductive or shut off. The interruption of the supply of signal current to the gate 46 in this manner will not cause interruption of the conductivity of the controlled rectifier through the main electrodes 44 and 45 until the potential difference across the main electrodes has dropped to a zero value, as pointed out above.

Thus, in producing the regulating action, the gate 46 intermittently causes the controlled rectifier 42 to become conductive to increase field energization but the gate, upon initiating such conductivity, then loses control until a succeedng signal applied to the gate enables the same to regain control.

In the functioning of the current regulating means 54 it will be seen that, when the current output of the alternator through the power rectifier 15 drops below the regulated value, a potential difference across the resistor 40 will cause the diode 76 to become conductive to supply current to the base 79 of the second transistor 75. This transistor thereupon becomes conductive through its main electrodes 77 and 78 to produce a corresponding increase in the potential of the reference point 63 and this, in turn, becomes effective on the gate 46 of the controlled rectifier 42 through the diode 84 in the same manner and for the same purpose as has already been explained above in connection with the functioning of the controlled rectifier in controlling the energization of the field winding 20.

In connection with the functioning of the generating system 10 it will also be observed that the controlled rectifier 42 acts not only as a regulating means for controlling the amount of excitation current for the field winding 20, but also as a rectifier as such for the field current so that the alternator 11 will be self-exciting and a separate exciter, such as has heretofore been required for large alternators, will not be needed.

Figure 2:
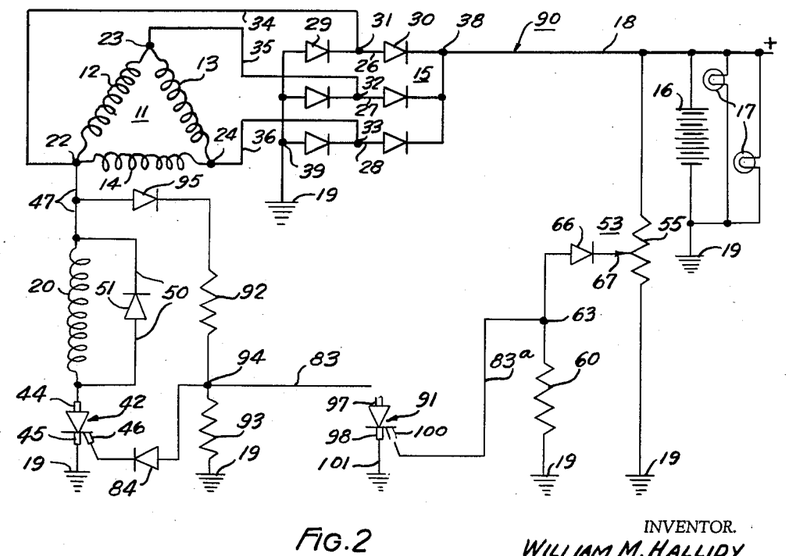
FIG. 2 is a wiring diagram representing another form of such a generating system and regulating means, and showing the regulating means being used to obtain voltage regulation by the use of a plurality of controlled rectifiers.

FIG. 2 of the drawings shows a generating system 90 which is generally similar to the system 10 of FIG. 1 with respect to the use of the controlled rectifier 42 in the circuit of the field winding 20 of the alternator 11, but wherein a second controlled rectifier 91 is included in the control circuit means and which eliminates the need for any transistors. The components of the system 90 which correspond with components of the system 10 have been designated by the same reference characters. The system 90 also differs from the system 10 in that it does not include any current regulating means although current regulation could be provided, if desired, as by use of the same means as that shown in FIG. 1.

The modified system 90 also differs from the system 10 in that resistors 92 and 93 are connected with the conductor 83 to provide the latter with a second voltage reference point or terminal 94 which is additional to the voltage reference point 63. The resistor 93 is connected between reference point 94 and the common ground 19 while the resistor 92 is connected between the reference point 94 and the conductor 47 of the field circuit through a suitable diode 95, preferably a Zener diode.

The second controlled rectifier 91 is similar to the controlled rectifier 42 in that it functions in a similar manner and has main anode and cathode electrodes 97 and 98 and includes a gate electrode 100. The cathode 98 is connected with the ground 19 by a conductor 101 and the gate 100 is connected with the reference point 63 through the portion 83ᵃ of the conductor 83.

From the above description of the modified generating system 90, it will be seen that when the phase terminal 22 becomes positive with respect to the ground 19, current will flow through the resistors 92 and 93 raising the potential of the reference point 94 so that gate-to-cathode current flows in the controlled rectifier 42, by reason of a signal being applied to the gate through the diode 84, to allow anode-to-cathode current to flow through the controlled rectifier for energizing the field winding 20. When the output voltage of the system exceeds the regulated voltage, the diode 66 becomes conductive and allows current to flow through the resistor 60. This raises the potential of the reference point 63 so that gate-to-cathode current flows in the second controlled rectifier 91 thereby permitting anode-to-cathode current to flow in the latter and which reduces the potential of the reference point 94 to take the control of the first controlled rectifier 42 away from the gate 46.

Thus it will be seen that, when the potential of the reference point 94 is increased to cause the first controlled rectifier 42 to become conductive, the field winding 20 will be energized and an increase in output voltage of the alternator will result. It will, thus, also be seen that the function of the second controlled rectifier 91 is to nullify the control of the gate 46 of the first controlled rectifier 42 by connecting the reference point 94 with the ground 19 through the main electrodes 97 and 98 of the second controlled rectifier when the value of the output voltage rises above the regulated value.

When the polarity of the phase terminal 22 becomes negative due to the inherent functioning of the alternator 11, the first and second controlled rectifiers 42 and 91 will both be shut off and this will permit the potential of the reference point 63 to regain control when the output voltage again falls below the regulated value.

Figure 3:
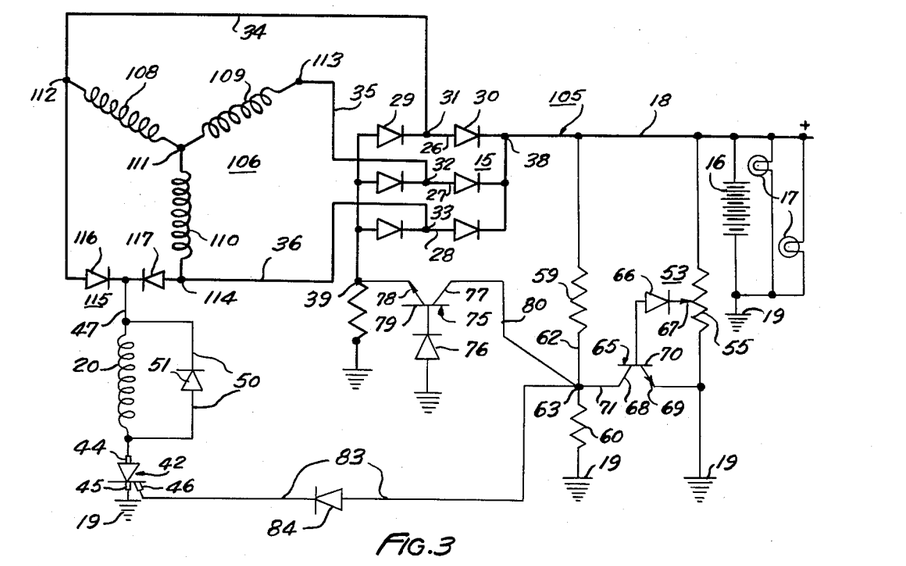
FIG. 3 is a wiring diagram showing a generating system and regulating means similar to FIG. 1 but in which an auxiliary rectifier means is used in circuit with the controlled rectifier.

FIG. 3 of the drawings shows a generating system 105 which is similar to the system 10 and in which the same components are designated by the same reference characters. In the modified system 105 the alternator 106 is shown as having its phase windings 108, 109 and 110 in a Y-connected or star-connected relation through a common phase terminal 111. The outer phase terminals or output terminals, 112, 113 and 114 correspond with the output terminals 22, 23 and 24 of the alternator 11 and are connected in a similar manner to the input terminals of the power rectifier 15.

The modified generating system 105 also differs from the system 10 in that the field circuit conductor 47 is connected to the two phase terminals 112 and 114 through a single-phase full-wave auxiliary or control rectifier 115 comprising a pair of rectifier cells 116 and 117.

The operation of the generating system 105 and the regulating means thereof is similar to that of the system 10 except that, through the use of the auxiliary rectifier 115, the period of time during which the gate 46 has no control over the conductivity of the controlled rectifier 42, is reduced to a relatively shorter time interval.

Figure 4:
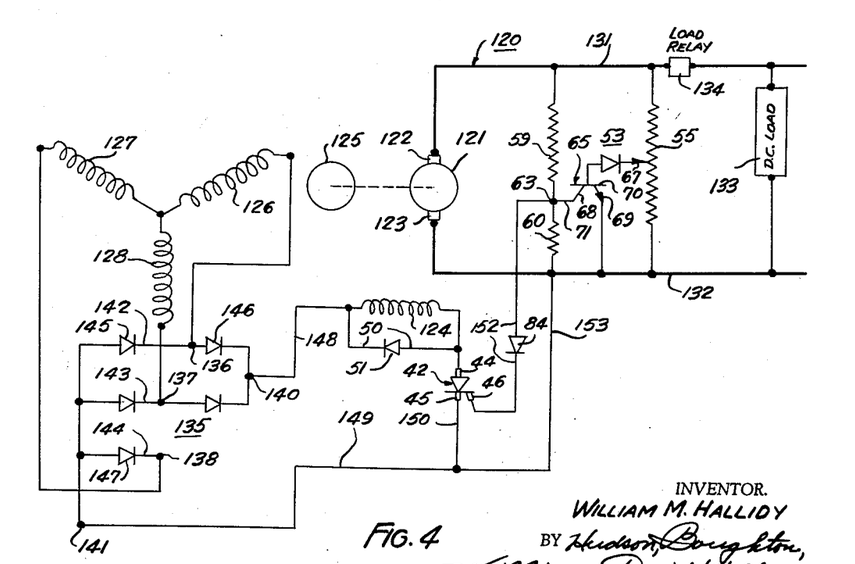
FIG. 4 is a wiring diagram showing the controlled rectifier regulating means of this invention applied to a direct current generating system.

FIG. 4 of the drawings shows another modified generating system 120 which employs the regulating means of this invention. The system 120 includes a direct current generator 121 having load terminals 122 and 123 and a field winding 124. The generator 121 includes a permanent magnet rotor 125 which is associated with a stator having separate alternating current phase windings 126, 127 and 128 for supplying energizing current to the field winding 124 in a manner to be explained hereinafter.

The modified generating system 120 also comprises load conductors 131 and 132 connected with the load terminals 122 and 123 for supplying load current to an external load 133. The load conductor 131 is here shown as having a suitable load relay or reverse current cut-out relay 134 located therein. The external load 133 can be any load desired to be supplied with direct current and may include a storage battery to be charged. When the load 133 does not include such a storage battery, the relay 134 can be omitted.

For energization of the field winding 124 the generating system 120 includes a suitable field circuit by which the field winding is connected with the phase windings 126, 127 and 128 through a control rectifier 135. The rectifier 135 has input terminals 136, 137 and 138 connected with the respective phase windings 126, 127 and 128 and also has direct current output terminals 140 and 141.

The rectifier 135 comprises three circuit arms 142, 143 and 144. The circuit arm 142 contains rectifier cells 145 and 146 located on opposite sides of the input terminal 136, and the circuit arm 143 likewise contains two such rectifier cells located on opposite sides of the input terminal 137. The circuit arm 144 contains only a single rectifier cell 147 which is located between the input and output terminals 138 and 141. It will be seen from the showing of the rectifier 135 in FIG. 4 and the description thereof as given just above, that this rectifier comprises five-sixths of a full-wave three-phase rectifier.

The field winding 124 has one end thereof connected with the output terminal 140 of the rectifier 135 by a conductor 148 of the field circuit, and has its other end connected with the output terminal 141 through a portion of the field circuit provided by the conductors 149 and 150 and through a controlled rectifier 42 of the same form as previously described herein. The controlled rectifier 42 has its main electrodes 44 and 45 located in the conductor 150 so as to be in series with the field winding 124 and the intermittent conductivity of the controlled rectifier controls the energizing current for the field winding.

The modified generating system 120 also includes voltage sensing means 53 which is responsive to the terminal or output voltage of the generator 121 and controls the functioning of the controlled rectifier 42. The voltage sensing means 53 is of the same form as that already described herein except that it is connected between the load conductors 131 and 132 instead of between a load conductor and a common ground. The components of the voltage sensing means 53 are designated by the same reference characters as have been previously used herein with reference to the same corresponding parts.

To render the controlled rectifier 42 intermittently conductive in response to the voltage sensing means 53 for correspondingly controlling the energization of the field winding 124, the gate electrode 46 is connected with the voltage reference terminal 63 and the output terminal 123 by control circuit means comprising the conductors 152 and 153. A suitable blocking diode 84, as described above, is provided in the conductor 152. A suitable diode 51, as previously described herein, is also provided in the field circuit and connected in shunt relation to the field winding 124 by conductor means 50.

By reason of the use of five-sixths of a full-wave three-phase rectifier as the control rectifier 135, it will be seen that for one-sixth of the overall generating cycle of the phase windings 126, 127 and 128, the potential across the main electrodes 44 and 45 of the controlled rectifier 42 will drop to a zero value. This will interrupt the conductivity of the controlled rectifier so that the gate 46 can region control to again initiate conductivity in response to a signal from the sensing means 53.

Figure 5:
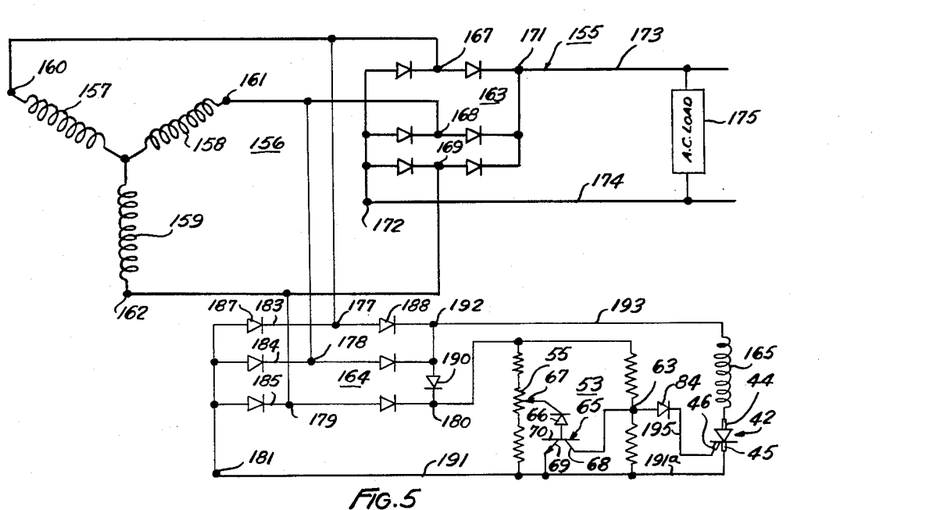
FIG. 5 is a wiring diagram showing the application of the controlled rectifier regulating means to an alternating current portion of a generating system.

FIG. 5 of the drawings shows another modified generating system 155 embodying the regulating means of this invention. The generating system 155 comprises an alternator, in this case a three-phase alternator 156 having phase windings 157, 158 and 159 and output terminals 160, 161 and 162, and rectifier means comprising a power rectifier 163 and a control rectifier 164. The alternator 156 also has a field winding 165.

The power rectifier 163 is a three-phase full-wave rectifier having input terminals 167, 168 and 169 connected respectively with the output terminals 160, 161 and 162, and also having direct current load terminals 171 and 172. The generating system 155 is here shown as also including load conductors 173 and 174 which are connected with the load terminals 171 and 172 of the power rectifier 163 and supply rectified current to a direct current external load 175.

The control rectifier 164 is here shown as being a three-phase full-wave rectifier having input terminals 177, 178 and 179 connected with the respective output terminals 160, 161 and 162 of the alternator 156 and also having direct current output terminals 180 and 181. The control rectifier 164 has three circuit arms 183, 184 and 185 containing the input terminals 177, 178 and 179, and each of these circuit arms includes a pair of rectifier cells 187 and 188 located on opposite sides of the input terminal thereof. For a purpose which will appear hereinafter, the control rectifier 164 also includes an additional rectifier cell 190 connected as a blocking cell between the output terminal 180 and the adjacent end of the circuit arm 184.

The generating system 155 also includes field circuit means for energizing the field winding 165 from the phase windings of the alternator 156 through a portion of the rectifier means of the system, in this instance through the control rectifier 164. For this purpose, one end of the field winding 165 is connected with the output terminal 181 of the control rectifier 164 by a conductor 191 and its other end is connected with what can be conveniently referred to as an auxiliary output terminal 192 of the control rectifier by a conductor 193. With these circuit connections for the field winding 165 it will be seen that because of the presence of the blocking rectifier cell 190, the control rectifier 164 will function as five-sixths of a three-phase full-wave rectifier in the energization of the field winding from the alternator.

The excitation of the field winding 165 is controlled by regulating means comprising a controlled rectifier 42 having its main electrodes 44 and 45 located in the portion of the field circuit provided by the conductor 191. The regulating means also comprises voltage sensing means 53 of the form already described hereinabove and which is responsive to changes in the operating condition of the alternator 156, namely variations in output or terminal voltage, by being connected across the output terminals 180 and 181 of the control rectifier 164. The regulating means of the generating system 155 also includes control circuit means connecting the gate electrode 46 of the controlled rectifier 42 with the voltage reference terminal 63 of the sensing means 53 and comprising a conductor 195 having the diode 84 therein and a portion 191a of the field circuit conductor 191.

With respect to the generating system 155 shown in FIG. 5, it will be understood, of course, that although the load 175 is here shown as a direct current load being supplied with current through the power rectifier 165, the load can, if desired, be an alternating current load in which case the power rectifier 165 would be omitted and the load would be connected to the output terminals of the alternator 156 through suitable load conductors.

Figure 6:
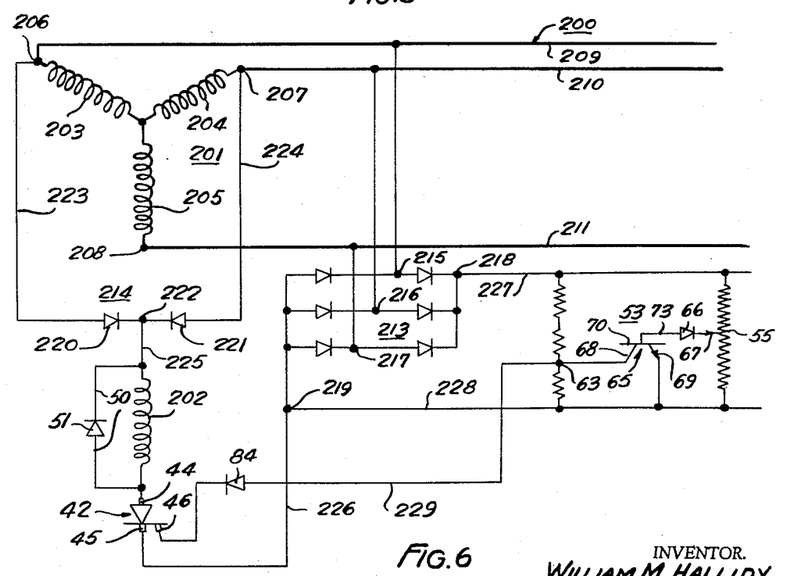
FIGS. 6 and 7 are wiring diagrams showing other applications of the controlled rectifier regulating means to alternating current generating systems.

FIG. 6 of the drawings shows still another modified generating system 200 embodying the novel regulating means of this invention and which includes an alternator 201 having a field winding 202 and phase windings 203, 204 and 205. The alternator 201 also has output terminals 206, 207 and 208 with which suitable load conductors 209, 210 and 211 are connected for supplying energizing current to an external load either directly, or through a power rectifier such as the power rectifier 163 of FIG. 5 when the external load is a direct current load.

The modified generating system 200 also includes rectifier means comprising two control rectifiers 213 and 214. The control rectifier 213 is here shown as being a three-phase full-wave rectifier having input terminals 215, 216 and 217 which are connected with the respective output terminals 206, 207 and 208 of the alternator 201 and also having direct current output terminals 218 and 219. The control or auxiliary rectifier 214 is a single-phase full-wave rectifier comprising rectifier cells 220 and 221 and an output terminal 222 located between the cells. The cells 220 and 221 are connected with the output terminals 206 and 207 of the alternator by conductors 223 and 224.

The generating system 200 also includes field circuit means for connecting the field winding 202 with phase windings of the alternator 201 through the rectifier means. Thus one end of the field winding is connected with the terminal 222 of the rectifier 214 by a conductor 225 and the other end is connected with the terminal 219 of the rectifier 213 by a conductor 226. The excitation current for the field winding 202 is controlled by a controlled rectifier 42 having its main electrodes 44 and 45 located in the portion of the field circuit provided by the conductor 226.

The regulating means of the generating system 200 also comprises voltage sensing means 53 which is responsive to changes in the operating condition of the alternator 201, namely, to changes in the terminal or output voltage, and control circuit means connecting the gate 46 of the controlled rectifier 42 in circuit with the alternator through the voltage sensing means. The voltage sensing means 53 is here shown as being connected with the alternator 201 through the control rectifier 213 and, for this purpose, is connected across the output terminals 218 and 219 of this control rectifier by conductors 227 and 228. The control circuit means of the generating system 200 also comprises a conductor 229 containing the above-mentioned diode 84 and connecting the gate electrode 46 of the controlled rectifier 42 with the voltage reference terminal 63 of the voltage sensing means 53. A protective diode 51 is preferably provided and is connected in shunt relation to the field winding 202.

Figure 7:
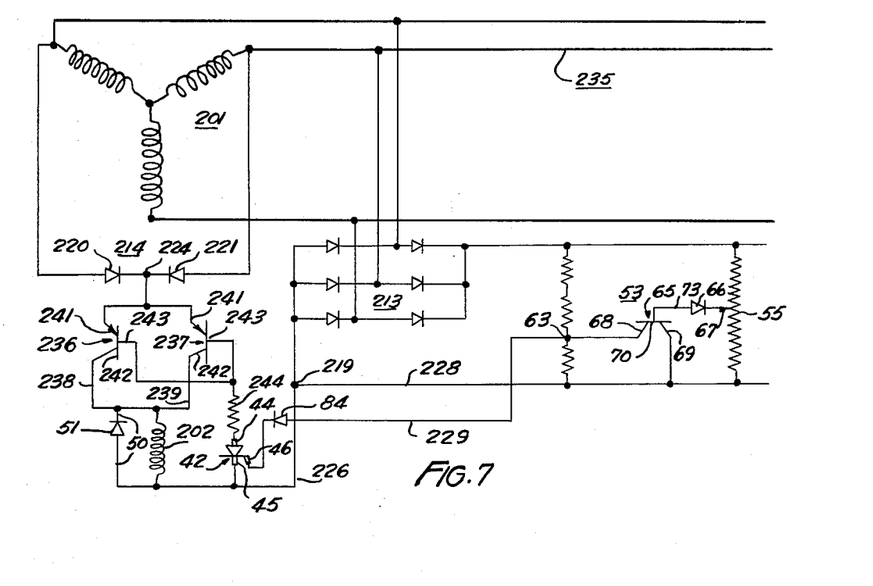

FIG. 7 of the drawings shows still another modified form of generating system 235 which is similar to the generating system 200 but in which the energization of the field winding 202 of the alternator 201 is controlled by a pair of transistors 236 and 237 in addition to a controlled rectifier 42. In other respects the generating system 235 is substantially the same as the generating system 200 and corresponding parts are designated by the same reference characters.

In the system 235, the field winding 202 has one end thereof connected with the rectifier terminal 222 through parallel circuit portions 238 and 239 having the respective transistors 236 and 237 located therein. Each of the transistors 236 and 237 has main electrodes comprising an emitter and a collector 241 and 242 and a control electrode or base 243. The parallel circuit portions 238 and 239 extend through the main electrodes 241 and 242 of the respective transistors 236 and 237.

The excitation of the field winding 202 is controlled by the variable or intermittent conductivity of the transistors 236 and 237 and which conductivity is, in turn, controlled by the controlled rectifier 42 in response to control signals supplied to the latter by the voltage sensing means 53. For this purpose the control electrodes 243 of the transistors 236 and 237 are connected with the output terminal 219 of the control rectifier 213 through the main electrodes 44 and 45 of the controlled rectifier 42. A suitable resistor 244 is provided in the portion of the circuit connecting the control electrodes of the transistors with the main electrode 44 of the controlled rectifier 42. The gate 46 of the controlled rectifier 42 is connected with the voltage sensing means 53 by the same control circuit means as in FIG. 6, namely, the conductor 229 containing the diode 84 and the conductor 226.

By the use of the transistors 236 and 237 in parallel in the field circuit for energizing the field winding 202, it will be seen that the current-carrying capacity of the control means is increased, that relatively smaller and less expensive transistors can be used for controlling the field current, and that the operating temperature of the transistors can be more readily maintained within a safe limit. It will also be seen that since the controlled rectifier 42 controls only the signal current to the control electrodes 243 of the transistors 236 and 237, this controlled rectifier can be of a relatively low load rating and will provide a higher gain in the control circuit means connecting the transistors with the voltage sensing means 53.

Figure 8:
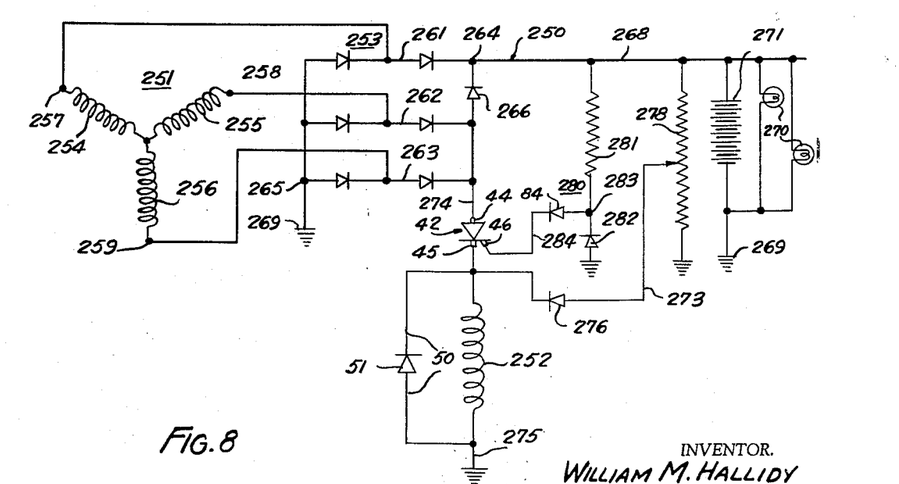
FIG. 8 is a wiring diagram showing the controlled rectifier regulating means applied to the direct current side of an alternator-rectifier generating system.

FIG. 8 of the drawings shows still another modified generating system 250 which is similar to the generating system 10 of FIG. 1 but is of a more simplified form and includes means providing for an initial or build-up energization for the field winding of the alternator independently of the portion of the field excitation provided by the operation of the voltage responsive regulating means.

The modified generating system 250 comprises, in general, an alternator 251 having a field winding 252, and a power rectifier 253 connected with the alternator for supplying current to an external load. The alternator 251 has phase windings 254, 255 and 256 and also has output terminals 257, 258 and 259.

The power rectifier 253 is a three-phase full-wave rectifier having circuit arms 261, 262 and 263 connected with the respective output terminals 257, 258 and 259, and also having direct current load terminals 264 and 265. The rectifier 253 also includes an additional blocking cell 266 connected between the circuit arms 261 and 262.

The output terminals 264 and 265 of the power rectifier 253 are connected with the external load through a load conductor 268 and a common ground 269. The external load is here shown as comprising lamps 270 in a storage battery 271 to be charged.

The field winding 252 is provided with a field circuit comprising first and second field circuit portions 273 and 274 which are connected with one end of the field winding. The other end of the field winding is connected with the common ground 269 by a field circuit conductor 275. The first field circuit portion 273 includes a suitable current blocking diode 276 and is connected with the load terminals 264 and 265 through a suitable potentiometer type of resistance device 278. The second field circuit portion 274 includes a controlled rectifier 42 having its main electrodes 44 and 45 located in this circuit portion for controlling the portion of the field energizing current being supplied therethrough.

The generating system 250 also includes voltage sensing means 280 which is here shown as comprising a suitable resistor 281 having one end thereof connected with the load conductor 268 and the other end thereof connected with the common ground 269 through a Zener diode or the like 282. The voltage sensing means 280 also includes a voltage reference terminal 283 located between the resistor 281 and the diode 282. The gate 46 of the controlled rectifier 42 is connected with the reference terminal 283 of the voltage sensing means 280 by control circuit means comprising a conductor 284 having the above-mentioned blocking diode 84 therein.

From the field circuit arrangement and regulating means shown in FIG. 8 and described above, it will be seen that the field winding 252 is energized in part through the first field circuit portion 273 and is energized in part through the second field portion 274 which is controlled by the controlled rectifier 42. The first field circuit portion 273 will supply energizing current to the field winding 252 for immediately exciting the alternator field as soon as the alternator is placed in operation and without any delay in waiting for the controlled rectifier 42 to become conductive. It will also be seen that during the operation of the generating system 250, the excitation of the field winding 252 will be controlled by the controlled rectifier 42 in accordance with changes in the operating condition of the alternator, namely, variations in the output voltage of the alternator as sensed by the voltage sensing means 280. A diode 50 for protecting the controlled rectifier 42 is preferably provided and is connected in shunt relation to the field winding 252 by conductor means 50.

Although FIGS. 3, 6 and 7 show generating systems in which the alternators 106, 201 and 201 have star-connected phase windings and which systems include single phase full-wave control rectifiers 115, 214 and 214 associated with such star-connected phase windings, it should be understood that the alternators 106, 201, and 201 could, if desired, be of the kind having delta-connected phase windings and that the control rectifiers 115, 214 and 214 would still be usable in the same relation with such delta-connected phase windings.

From the accompanying drawings and the foregoing detailed description it will now be readily understood that this invention provides novel electrical generating systems and generator regulating means wherein the field excitation of an alternator of the system is controlled in an efficient and practical manner by the use of an avalanche breakdown type of control device, preferably a controlled rectifier, for varying the field excitation of the alternator in accordance with variations in the power output above and below a desired regulated value. The use of such a controlled rectifier in this relation is also advantageous because it is obtainable at low cost and is functionally reliable regardless of temperature variations, and is of a small size and can be located at any convenient point in an assembly of electrical components comprising the generating system in which the controlled rectifier is being used.

Other advantages can be pointed out for a regulating means employing such a controlled rectifier, namely, that when the device is conducting it is stable in only two conditions of conductivity, one being at high voltage and low current and the other at low voltage and high current; that the IR drop through this device is small with a consequent small amount of field current being dissipated therein; and that in some or all of the generating system disclosed herein the controlled rectifier acts also as a current blocking device to prevent a reverse flow of battery current through the field winding and thus makes a load relay unnecessary.

Although the novel electrical generating systems and the regulating means of this invention have been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In an electric generating system, a generator having a field winding and also having output terminals for connection of an external load with the generator, field circuit means for said field winding, an intermittently conductive control device controlling the field excitation and having main electrodes in said field circuit means and also having a control electrode, said device having only two stable states of conductivity for flow of field control current through said main electrodes and both states providing low IR drop for minimum power loss in the control device, means for supplying an interrupted current through said field circuit means, and control circuit means connected with said control electrode for supplying control current thereto in accordance with different operating conditions of the generator, the intermittent conductivity through said main electrodes being initiated by a firing voltage thereacross provided by said interrupted current and which firing voltage is inversely proportional to the control current being supplied to said control electrode.

2. An electrical generating system as defined in claim 1 and wherein the generator is an alternator having phase windings, and wherein the interrupted current is supplied by such phase windings.

3. An electric generating system as defined in claim 1 and wherein the generator is an alternator having phase windings, and wherein the means for supplying the interrupted current to said field circuit means includes a rectifier means.

4. An electric generating system as defined in claim 1 and wherein the generator is an alternator having phase windings and the interrupted current is supplied by such phase windings, and wherein a power rectifier is connected with the output terminals of the alternator and has direct current load terminals for connection of the external load therewith.

5. An electric generating system as defined in claim 1 and wherein the generator is a direct current generator having separate alternating current windings connected with the field circuit means through a rectifier means.

6. In an electric generating system, a generator having a field winding and also having output terminals for connection of an external load with the generator, field circuit means for said field winding, a control device controlling the energization of said field winding and having electrodes located in said field circuit means, said device being intermittently conductive through said electrodes in response to avalanche breakdown therebetween, and control circuit means connecting said device in circuit with said generator to supply direct current control signals to said device for producing the avalanche breakdown in response to changes in the operating condition of the generator.

7. In an electric generating system, a generator having a field winding and also having output terminals for connection of an external load with the generator, field circuit means for said field winding, means for supplying an interrupted current to said field circuit means, a controlled rectifier having main electrodes in said field circuit means for controlling field excitation and also having a control electrode, and control circuit means responsive to different operating conditions of the generator and connected with one of said main electrodes and with said control electrode for supplying control signals to the latter, said control circuit means including control means responsive to voltage at said output terminals and operative when the voltage at the output terminals exceeds a predetermined value to terminate the supply of control signals to said control electrode.

8. In an electric generating system, a generator having a field winding and also having output terminals for connection of an external load with the generator, field circuit means for said field winding, a solid-state intermittently conductive control device having main electrodes and also having a starter electrode for initiating conduction through said main electrodes and which starter electrode loses control of the conductivity of the device upon initiation of such conductivity, said device having its main electrodes in said field circuit means for controlling field excitation, means for supplying an interrupted current to said field circuit means, and control circuit means connecting said device in circuit with said generator, said control circuit means being responsive to changes in the operating condition of said generator and effective to supply direct current signals to said starter electrode only when the voltage at said output terminals falls below a predetermined value for initiating the conductivity of said device.

9. In an electric generating system; an alternator having a field winding and also having output terminals; rectifier means connected with said output terminals; circuit means comprising a field circuit connecting said field winding with said output terminals through said rectifier means, and a control circuit responsive to different operating conditions of the alternator; and regulating means comprising a controlled rectifier located in said field circuit and also connected in circuit with said alternator by said control circuit and effective for varying the excitation of said field winding.

10. In an electric generating system; an alternator having a field winding and also having output terminals; rectifier means connected with said output terminals; circuit means comprising a field circuit connecting said field winding with said output terminals through said rectifier means, and a control circuit responsive to different operating conditions of the alternator; and regulating means comprising a solid-state intermittently conductive device having main electrodes and also having a starter electrode for initiating conduction through said device and which starter electrode loses control of the conductivity of said device upon initiation of such conductivity; said device having its main electrodes in said field circuit for controlling field excitation, and said control circuit being connected with said control electrode to supply signals to the latter for initiating the conductivity of said device.

11. In an electric generating system; an alternator having phase windings and a field winding; rectifier means including a power rectifier having input terminals connected with said phase windings and also having direct current output terminals for connection of a direct current load therewith; a field circuit connecting said field winding in circuit with phase windings of the alternator through at least a portion of said rectifier means; a solid-state control device having main electrodes comprising a cathode and an anode, and also having a gate electrode; said device having an intermittent conductivity through said main electrodes initiated by said gate electrode, and said conductivity when thus initiated being independent of said gate electrode and being self-stopping in response to a substantially zero potential across said main electrodes; said device being located in said field circuit with the conductivity through said main electrodes controlling the excitation of said field winding; and sensing means comprising voltage sensing circuit means connecting said gate electrode in circuit with said alternator.

12. An electric generating system as defined in claim 11 and wherein said sensing means comprises a current sensing circuit means connecting said gate electrode in circuit with said alternator.

13. In an electric generating system; an alternator having phase windings and a field winding; rectifier means connected with said phase windings and having direct current output terminals; field circuit means connecting said field winding with phase windings of the alternator through a first portion of said rectifier means; control circuit means; and regulating means for regulating the excitation of said field winding comprising a controlled rectifier located in said field circuit means and also connected in circuit with phase windings of the alternator by said control circuit means through a second portion of said rectifier means; said first portion comprising a lesser portion of said rectifier means than said second portion.

14. A generating system as defined in claim 13 and wherein said alternator is a three-phase alternator having Y-connected phase windings; and wherein said first portion of said rectifier means is a full-wave single-phase rectifier means connected between two of the phase windings.

15. A generating system as defined in claim 13 and wherein said alternator is a three-phase alternator having Y-connected phase windings; and wherein said first portion of said rectifier means is a full-wave single-phase rectifier means connected between two of the phase windings, and said second portion is a full-wave three-phase rectifier means.

16. A generating system as defined in claim 13 and wherein said alternator is a three-phase alternator; and wherein said second portion of said rectifier means is a full-wave three-phase rectifier means and said first portion comprises five-sixths of said full-wave three-phase rectifier means.

17. In an electric generating system; an alternator having phase windings and a field winding; a power rectifier connected with said phase windings and having direct current output terminals for connection of a direct current load therewith; regulating means comprising first and second controlled rectifiers each having main electrodes and a gate electrode; a field circuit connecting said field winding in circuit with phase windings of the alternator and one of said output terminals and extending through the main electrodes of the first controlled rectifier; a voltage sensing means; and control circuit means comprising a first circuit portion connecting the gate electrode and one of the main electrodes of said first controlled rectifier in circuit with said output terminals through the main electrodes of said second controlled rectifier, and a second circuit portion connecting the gate electrode and one of the main electrodes of said second controlled rectifier with said output terminals through said voltage sensing means.

18. In an electric generating system; an alternator having phase windings and a field winding; a power rectifier having input terminals connected with said phase windings and also having direct current output terminals for connection of a direct current load therewith; a field circuit for said field winding operatively connected to phase windings of said alternator to be supplied with an interrupted current therefrom; a controlled rectifier having main electrodes comprising a cathode and an anode, and also having a gate electrode; said controlled rectifier having an intermittent conductivity through said main electrodes initiated by said gate electrode, and said conductivity when thus initiated being independent of said gate electrode and being self-stopping in response to a substantially zero potential across said main electrodes; said controlled rectifier being connected in said field circuit with said main electrodes controlling the excitation of said field winding; sensing means responsive to output terminal voltage variations above and below a given regulated voltage value; and control circuit means connecting said gate electrode with said sensing means.

19. In an electric generating system; an alternator having phase windings and a field winding; rectifier means connected with phase windings of the alternator and having direct current output terminals; a field circuit for said field winding and extending through at least a portion of said rectifier means; a controlled rectifier having main electrodes comprising a cathode and an anode, and also having a gate electrode; said controlled rectifier having an intermittent conductivity through said main electrodes initiated by said gate electrode, and said conductivity when thus initiated being independent of said gate electrode and being self-stopping in response to a substantially zero potential across said main electrodes; said controlled rectifier being connected in said field circuit with said main electrodes controlling the excitation of said field winding; sensing means connected in circuit with said alternator and including transistor means having main electrodes and a control electrode; and control circuit means extending through the main electrodes of said transistor means and connecting said sensing means with said gate electrode.

20. In an electric generating system; a generator having a field winding and output terminals; a field energizing circuit for said field winding; a voltage sensing means connected with said output terminals; a pair of transistors each having main electrodes and a control electrode; the main electrodes of said transistors being connected in a parallel circuit relation in said field circuit with the parallel circuit portions in series with said field winding; and control circuit means connecting the control electrodes of said transistors with said voltage sensing means.

21. In an electric generating system; an alternator having phase windings and a field winding; rectifier means connected with phase windings of the alternator and having direct current output terminals; a field circuit for said field winding and extending through at least a portion of said rectifier means; a voltage sensing means connected with said output terminals; a pair of transistors each having main electrodes and a control electrode; the main electrodes of said transistors being connected in a parallel circuit relation in said field circuit with the parallel circuit portions in series with said field winding; a controlled rectifier having main electrodes and a gate electrode; and control circuit means comprising a first control circuit portion connected with the control electrodes of said transistors and extending through the main electrodes of said controlled rectifier, and a second control circuit portion connecting the gate electrode of said controlled rectifier with said voltage sensing means.

22. In an electric generating system; an alternator having phase windings and a field winding; rectifier means connected with phase windings of the alternator and having direct current output terminals; a field circuit for said field winding extending through at least a portion of said rectifier means and including first and second parallel circuit portions; said field winding being energizable through said first parallel circuit portion independently of said second parallel circuit portion; a voltage sensing means connected with said output terminals; a controlled rectifier having main terminals and a gate terminal and being disposed with said main terminals in said second parallel circuit portion for controlling field energization through the latter; and control circuit means connecting said gate electrode with said voltage sensing means.

23. An electric generating system as defined in claim 22 and wherein said alternator is a three-phase alternator and said rectifier means is a three-phase full-wave power rectifier whose direct current output terminals are adapted for connection of an external load therewith; and wherein the portion of said rectifier means which is included in said first parallel circuit portion is a three-phase full-wave rectifier means, and the portion included in said second parallel circuit portion comprises five-sixths of a three-phase full-wave rectifier means.

24. In an electrical generating system, generator means having a field winding and alternating current windings, field circuit means for said field winding connected to alternating current windings of the generator means to be supplied by interrupted current therefrom, an intermittently conductive control device controlling the energization of said field winding and having main electrodes in said field circuit means and having a control electrode, and control circuit means connected with said control electrode for supplying direct current control signals thereto in accordance with different operating conditions of the generator, the intermittent conductivity through said main electrodes being initiated by a firing voltage thereacross provided by said interrupted current.

25. In an electrical generating system, generator means having a field winding, alternating current windings, and output terminals; field circuit means for said field winding connected to alternating current windings of the generator means to be supplied by interrupted current therefrom, an intermittently conductive control device controlling the energization of said field winding and having main electrodes in said field circuit means and having a control electrode, said device having only two stable states of conductivity for flow of field control current through said main electrodes and both states providing low IR drop for minimum power loss in the control device, and control circuit means connected with said control electrode for supplying direct current control signals thereto in accordance with different operating conditions of the generator, the intermittent conductivity through said main electrodes being initiated by a firing voltage thereacross provided by said interrupted current and which firing voltage is inversely proportional to the control current being supplied to said control electrode, said control circuit means being operative when voltage at said output terminals exceeds a regulated value to effect termination of the supply of control signals to said control electrode.

26. A system as defined in claim 25 wherein said control circuit means includes a diode responsive to voltage at said output terminals and conductive when voltage at said output terminals exceeds a regulated value to effect termination of the supply of control signals to said control electrode.

27. In an electric generating system, generator means having a field winding and alternating current windings, field circuit means for said field winding connected to alternating current windings of the generator means to be supplied by interrupted current therefrom, a solid-state controlled rectifier controlling energization of said field winding and having main electrodes located in said field circuit means and having a control electrode, control circuit means including a direct voltage reference point operatively connected to said control electrode, and means operative when voltage of the generator means falls below a regulated value to raise the direct voltage of said reference point from the voltage thereof when voltage of the generator means is at substantially a regulated value for supplying direct current signals to said control electrode and operative when voltage of the generator means rises above a regulated value to lower the direct voltage of said reference point from the voltage thereof when voltage of the generator means is at substantially a regulated value for terminating the supply of direct current signals to said control electrode.

References Cited in the file of this patent

UNITED STATES PATENTS

| | | |
|---|---|---|
| 2,472,538 | Krauer et al. | June 7, 1949 |
| 2,717,352 | Ribner | Sept. 6, 1955 |
| 2,846,640 | Cherones et al. | Aug. 5, 1958 |
| 2,909,705 | Husson | Oct. 20, 1959 |

OTHER REFERENCES

"Electronic Regulators," by Arnold Benson, Electronics, pp. 104–107, April 1943.

"Diode Applications," Electronics, pp. 199–202, March 1955.